July 9, 1963

A. N. NAGEL 3,097,015

VEHICLE BODY

Filed Oct. 5, 1960

INVENTOR.
Arthur N. Nagel
BY
Herbert Furman
ATTORNEY

July 9, 1963        A. N. NAGEL        3,097,015
VEHICLE BODY
Filed Oct. 5, 1960        2 Sheets-Sheet 2
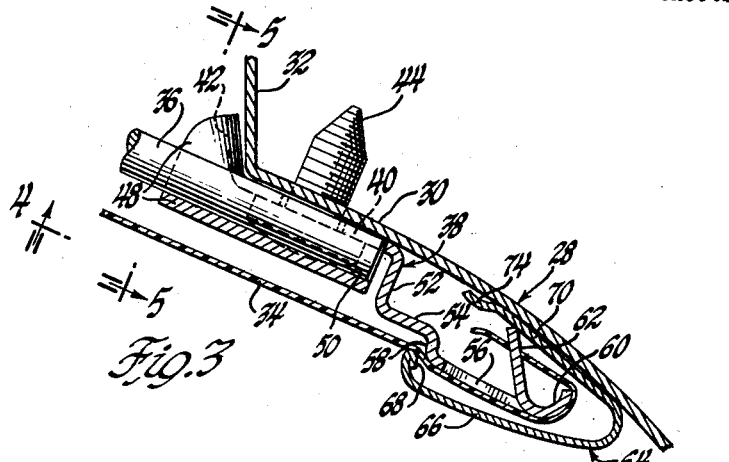
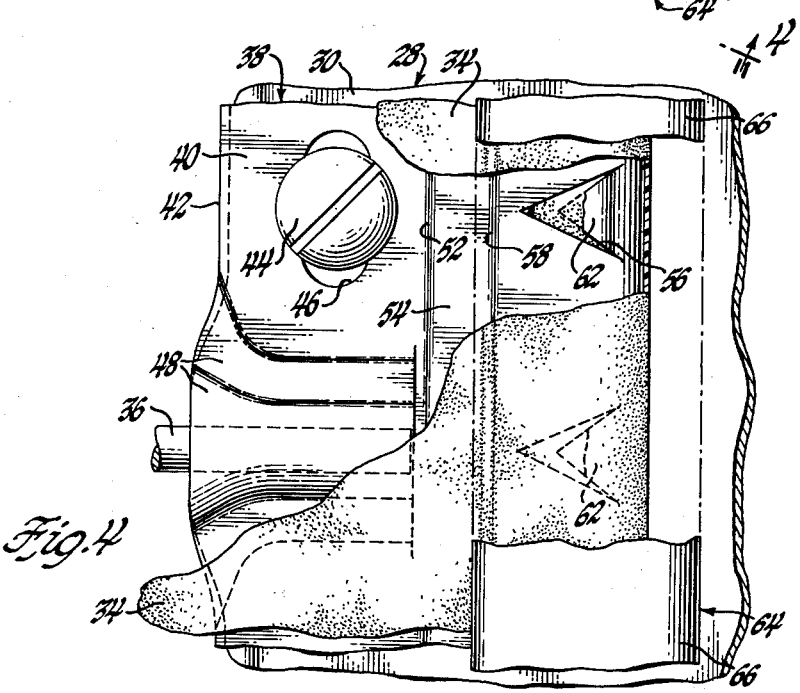
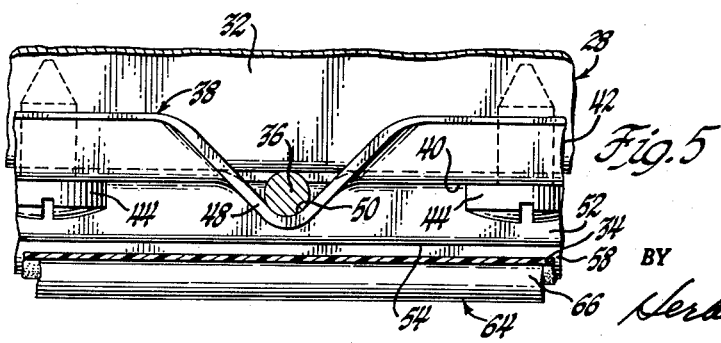
INVENTOR.
*Arthur N. Nagel*
BY *Herbert Furman*
ATTORNEY

# United States Patent Office 3,097,015
Patented July 9, 1963

3,097,015
VEHICLE BODY
Arthur N. Nagel, Royal Oak, Mich., assignor to General Motors Corporation, Detroit, Mich., a corporation of Delaware
Filed Oct. 5, 1960, Ser. No. 60,662
4 Claims. (Cl. 296—137)

This invention relates to vehicle bodies and more particularly to a trim assembly for vehicle bodies.

The trim assembly of this invention is particularly adapted for anchoring opposite edge portions of headlining trim fabric on the body and also tensioning the fabric transversely thereof so that it presents a smooth, even and unwrinkled appearance.

At the present time many vehicle bodies include serrated retainer strips which provide the anchoring means for the edge portions of the headlining trim fabric, with the headlining being supported intermediate the retainer strips by listing wires which span the retainer strips. This manner of mounting headlining trim fabric on vehicle bodies has been used for many years with great success, but often causes difficulties in the mounting of the fabric due to wrinkles being developed when adjacent portions of the fabric are unevenly tensioned.

The trim assembly of this invention is of this general type in that it includes a toothed or serrated retainer member which anchors the edge portion of the fabric. However, the trim assembly of this invention further includes a molding member which not only adds a decorative effect to the headlining and conceals any wrinkles adjacent the edge portion thereof, but further provides an additional means for tensioning the fabric at an area spaced from the anchored edge portion thereof to thereby decrease wrinkling to a minimum. The retainer member further provides the mounting means for the molding member and also for the listing wires.

The primary object of this invention is to provide a new and improved trim assembly for vehicle bodies. Another object of this invention is to provide a trim assembly for vehicle bodies which includes means for anchoring and tensioning the trim fabric in a manner so as to eliminate wrinkling and uneven appearance thereof and also means for adding to the decorative effect of the trim fabric.

These and other objects of the invention will be readily apparent from the following specification and drawings wherein:

FIGURE 3 is an enlarged view of a portion of FIGURE 2;

FIGURE 4 is a view taken generally along the plane indicated by line 4—4 of FIGURE 3 with parts thereof broken away for clarity of illustration; and FIGURE 5 is a view taken generally along the plane indicated by line 5—5 of FIGURE 3.

Figure 1:
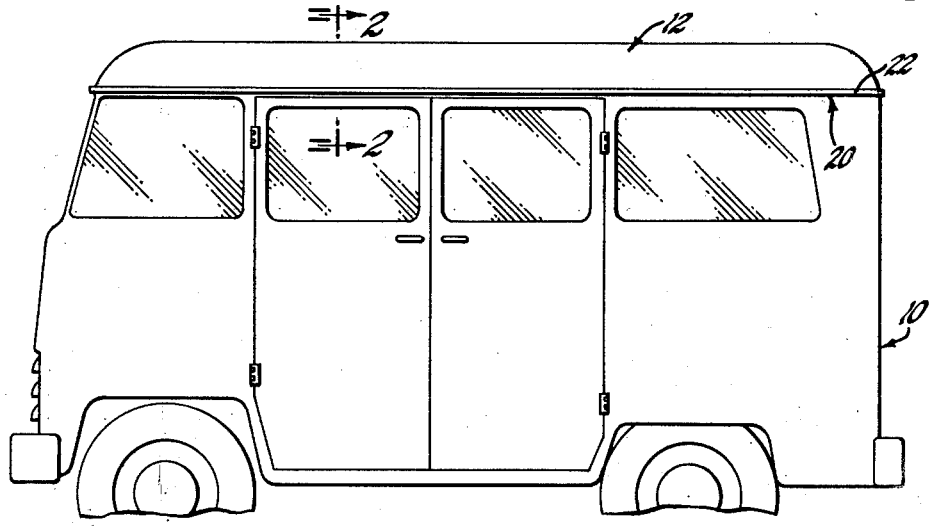
FIGURE 1 is a side elevational view of a vehicle body embodying a trim assembly according to this invention.
Figure 2:
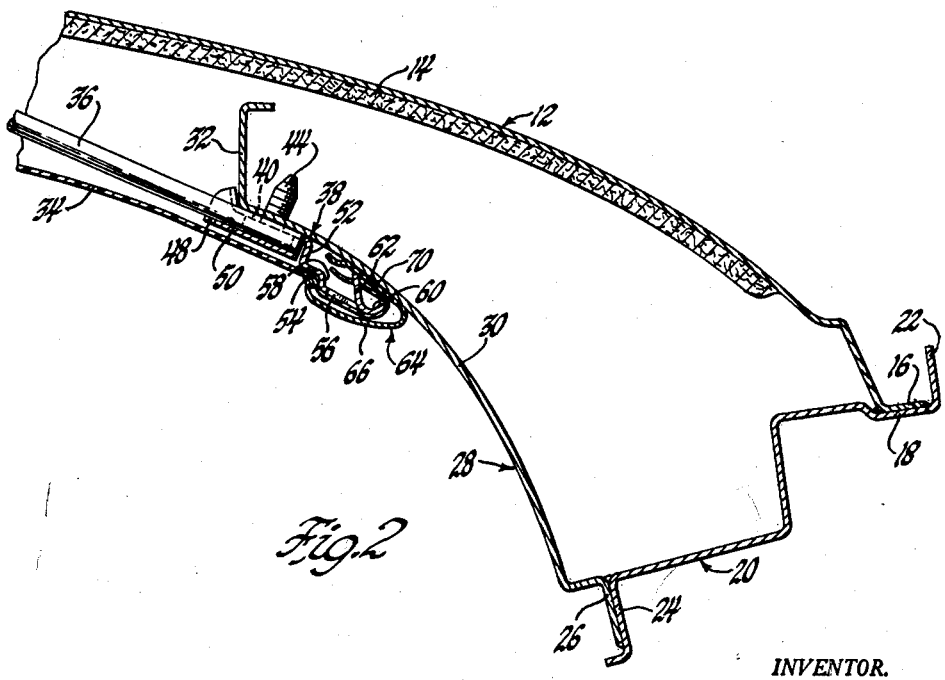
FIGURE 2 is an enlarged sectional view taken generally along the plane indicated by line 2—2 of FIGURE 1.

Referring now particularly to FIGURES 1 and 2 of the drawings, a vehicle body 10 includes a roof panel 12 which has sound deadener material 14 secured to the inner surface thereof. The panel 12 terminates at the edge portion thereof in a laterally extending flange 16 which is welded to an offset wall 18 of a body header member 20. Member 20 includes an outboard laterally extending flange 22 which provides a drip gutter with the roof panel 12 and further includes an inboard laterally extending flange 24 which is secured to a flange 26 of an inner body trim or halo panel 28. Panel 28 includes an arcuate wall portion 30 which terminates in an inboard laterally extending angled wall portion 32. A trim fabric or headlining 34 extends both transversely and longitudinally of the body between the halo panels 28 at each side thereof in order to conceal the inner surface of the roof panel 12 and to also provide a decorative effect for the interior of the body 10. A plurality of listing wires 36 extend transversely of the body and are spaced longitudinally thereof, with the listing wires 36 supporting the headlining 34 intermediate the sides of the body in a well known manner.

Referring now particularly to FIGURES 3 through 5 of the drawings, an elongated retainer member 38 includes angularly related wall portions 40 and 42 which are located adjacent wall portions 30 and 32 of member 28, with wall portion 40 being secured to wall portion 30 by a number of longitudinally spaced sheet metal screw 44. As shown in FIGURE 4, the openings 46 in wall portion 40 are slotted to provide for longitudinal adjustment of the retainer member 38 relative to the halo panel 28. Wall portion 40 is slit at a number of spaced longitudinal locations thereof and the material 48 of wall portions 40 and 42 to one side of the slit is embossed outwardly to provide a longitudinally spaced series of pockets 50 with wall portion 30, with these pockets receiving the ends of the listing wires 36 in order to mount the listing wires on the body.

Wall portion 40 merges on an arcuate juncture rib into a lateral wall portion 52 extending generally normal to the halo panel 28, with this wall portion merging on an arcuate juncture rib into wall portion 54 which extends generally parallel to the wall portion 28. Wall portion 54 is joined to a wall portion 56 by a short juncture wall portion 58 to locate wall portions 54 and 56 in laterally offset relationship with respect to each other. Wall portion 56 terminates in an arcuate edge portion 60, which is spaced from panel 28, as can be seen in FIGURE 3.

A number of longitudinally spaced teeth 62 are lanced from the wall portion 56 and are bent angularly with respect thereto, with the distal portions of the teeth extending to adjacent the inner surface of the halo panel 28. The edge portion of the headlining 34 is wrapped around wall portion 56 and the adjacent arcuate edge portion 60 and is then pushed inwardly between the teeth 62 and the halo member 28 so as to be impaled upon the teeth 62, as shown in FIGURES 3 and 4, to anchor the headlining 34 to the retainer member 38 and to further tension the headlining 34 between its opposite edge portions.

A generally U-shaped elongated molding member 64 includes a first arcuate shaped leg 66 which overlies wall portion 56 and terminates in a return bent lateral edge portion 68 which engages the headlining 34 to one side of wall portion 56 and opposite wall portion 54 to crease the headlining, as shown in FIGURE 3, and thereby additionally tension the fabric 34 between its opposite edge portions. The leg 66 further conceals any wrinkles which often occur in the headlining adjacent the anchored edge portion thereof when adjacent portions of the headlining are unevenly tensioned transversely thereof. The other leg 70 of the molding member 64 extends along the inner surface of the halo panel 28 and is wedged between the halo panel and the distal portions of teeth 62 so that this leg not only serves to additionally retain the headlining on the teeth 62, but also to mount the molding member 64 on the body. In order to facilitate insertion of the leg 70 between the teeth and the halo member 28, the edge portion 74 thereof is arcuately curved. Additionally, this arcuate edge portion 74 serves to prevent tearing of the fabric 34 when the molding member is mounted in place and the leg 70 is pushed inwardly of the body to wedge it between the teeth 62 and the halo panel 28.

It will be understood, of course, that the aforementioned structure including the halo panel 28 and the retainer member 30 is provided along each side of the body 10 and that the trim fabric or headlining 34 is tensioned transversely of the body. Likewise, the same structure may be provided at the front and rear header structures of the body. It will also be understood, of course, that this structure may only be provided along one side or end of the body and that other anchoring means may be provided along an opposite side or end of the body to thereby anchor opposite edge portions of the headlining.

Thus, this invention provides a new and improved trim assembly for vehicle bodies.

I claim:

1. Means for mounting trim fabric on a vehicle body, comprising, in combination, means securing a portion of said fabric on said body, and means anchoring an edge portion of said fabric on said body and tensioning said fabric against said securing means, said anchoring means comprising, a support member mounted on said body, a retainer member mounted on said support member and including a pair of offset wall portions, one of said wall portions being located in spaced relationship to said support member and terminating in an arcuate edge portion, a plurality of teeth extending from said one of said wall portions to adjacent said support member, said edge portion of said fabric being wrapped around said one wall portion and arcuate edge portion and being impaled on said teeth to anchor said edge portion of said fabric on said body and tension said fabric against said securing means, and a molding member having a pair of spaced legs, one of said legs overlying said one wall portion and engaging said fabric opposite said other wall portion to crease said fabric toward said other wall portion and further tension said fabric against said securing means, the other of said legs being wedged between the distal portions of said teeth and said support member to mount said molding member on said retainer member and retain said fabric on said teeth.

2. In a vehicle body having a body panel and a trim fabric for concealing said panel, the combination comprising, first means anchoring one edge portion of said fabric on said body, and second means anchoring an opposite edge portion of said fabric on said body and tensioning said fabric against said first anchoring means to locate said fabric in concealing relationship to said panel, said second means comprising, a support member mounted on said body, a retainer member mounted on said support member and including a pair of offset wall portions located in spaced relationship to said support member, one of said wall portions terminating in an arcuate edge portion, a plurality of teeth struck from said one of said wall portions and extending to adjacent said support member, said trim fabric being wrapped around said one wall portion and arcuate edge portion and being impaled on said teeth to anchor said other edge portion of said fabric on said body and tension said fabric against said first anchoring means, and a generally U-shaped molding member having a pair of spaced legs, one of said legs overlying said one wall portion and engaging said fabric opposite said other wall portion to crease said fabric toward said other wall portion and further tension said fabric against said first anchoring means, said other leg being wedged between the distal portions of said teeth and said support member to mount said molding member on said retainer member and retain said fabric on said teeth.

3. In a vehicle body having a body member and trim fabric having a portion thereof secured to said body, means anchoring an edge portion of said fabric on said body member and tensioning said fabric against said securing means, comprising, in combination, a retainer member mounted on said body member and including a portion located in spaced relationship to said body member, a plurality of teeth extending from said retainer portion to adjacent said support member, said edge portion of said fabric being wrapped around said retainer portion and being impaled on said teeth to anchor said edge portion of said fabric on said body member and tension said fabric against said securing means, and a molding member having a pair of spaced legs, one of said legs overlying said retainer portion and engaging said fabric to one side thereof to crease said fabric toward said body member and further tension said fabric against said securing means, the other of said legs being wedged between the distal portions of said teeth and said body member to mount said molding member on said body and retain said fabric on said teeth.

4. In a vehicle body having a body member and trim fabric having a portion thereof secured to said body, means anchoring an edge portion of said fabric on said body member and tensioning said fabric against said securing means, comprising, in combination, a retainer member mounted on said body member and including a portion located in spaced relationship to said body member, a plurality of teeth extending from said retainer portion to adjacent said support member, said edge portion of said fabric being wrapped around said retainer portion and being impaled on said teeth to anchor said edge portion of said fabric on said body member and tension said fabric against said securing means, a molding member having a pair of spaced legs, one of said legs overlying said retainer portion and engaging said fabric to one side thereof to crease said fabric toward said body member and further tension said fabric against said securing means, the other of said legs being wedged between the distal portions of said teeth and said body member to mount said molding member on said body and retain said fabric on said teeth, and means on said other leg to move said teeth away from said body member and permit insertion of said other leg between said teeth and said body member.

References Cited in the file of this patent

UNITED STATES PATENTS

| | | |
|---|---|---|
| 2,276,530 | Weaver et al. | Mar. 17, 1942 |
| 2,390,193 | Tandetzke | Dec. 4, 1945 |